June 22, 1954 T. R. PHILLIPS 2,682,018

WRAP-AROUND ASSEMBLY FOR ELECTRICAL COMPONENTS

Filed July 14, 1951

Inventor

THOMAS R. PHILLIPS

By R. P. Morris

Attorney

Patented June 22, 1954 2,682,018

UNITED STATES PATENT OFFICE 2,682,018

WRAP-AROUND ASSEMBLY FOR ELECTRICAL COMPONENTS

Thomas R. Phillips, Belleville, N. J., assignor to International Telephone and Telegraph Corporation, a corporation of Maryland Application July 14, 1951, Serial No. 236,818

1 Claim. (Cl. 317—101)

This invention relates to assemblies of electrical components and particularly to assemblies in which the components are inserted into a compact container.

Heretofore it was customary to mount electrical components on Bakelite or presswood in circuit relationship and then insert and fasten the assembled components in a container. Some of the disadvantages of mounting electrical components on presswood or Bakelite are that they are difficult to work with because of burning and scorching when contacted by a soldering iron; separate operations were required to first fasten the presswood or Bakelite mountings to the inside of the container and then to insulate the components from the insides of the container.

An object of this invention is to provide an improved mounting of electrical components by using a flexible insulating sheet, wrapping the insulating sheet around the components and inserting the sheet and components into a container so that the components, in a single operation, are insulated from the sides of the container, and are held firmly in place by virtue of the flexible sheet fitting tightly against the inside of the container. A further advantage of the invention is that the components are discretely positioned so that upon wrapping them in the insulating sheet, the components are in position to afford optimum performance; e. g., a pair of transformers may be positioned so that the flux lines of one will cut the flux lines of the other at 90°. Another advantage is in the simplicity of the invention, requiring very few parts and a minimum number of operations.

The above-mentioned and other features and objects of this invention and the manner of attaining them will become more apparent and the invention itself will be best understood, by reference to the following description of the embodiments of the invention taken in conjunction with the accompanying drawings, wherein.

Figure 1:
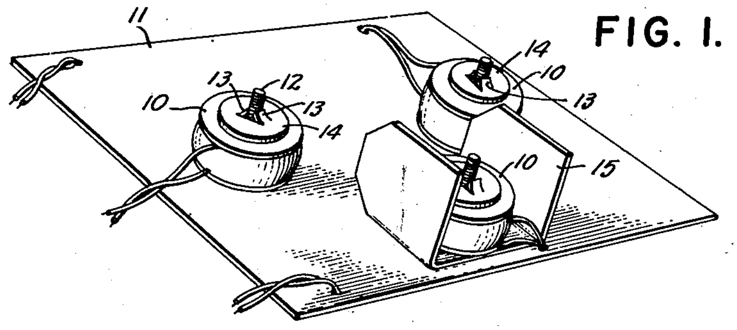
Fig. 1 is a perspective view of an open flexible insulating sheet showing electrical components mounted thereon.
Figures 2, 3:
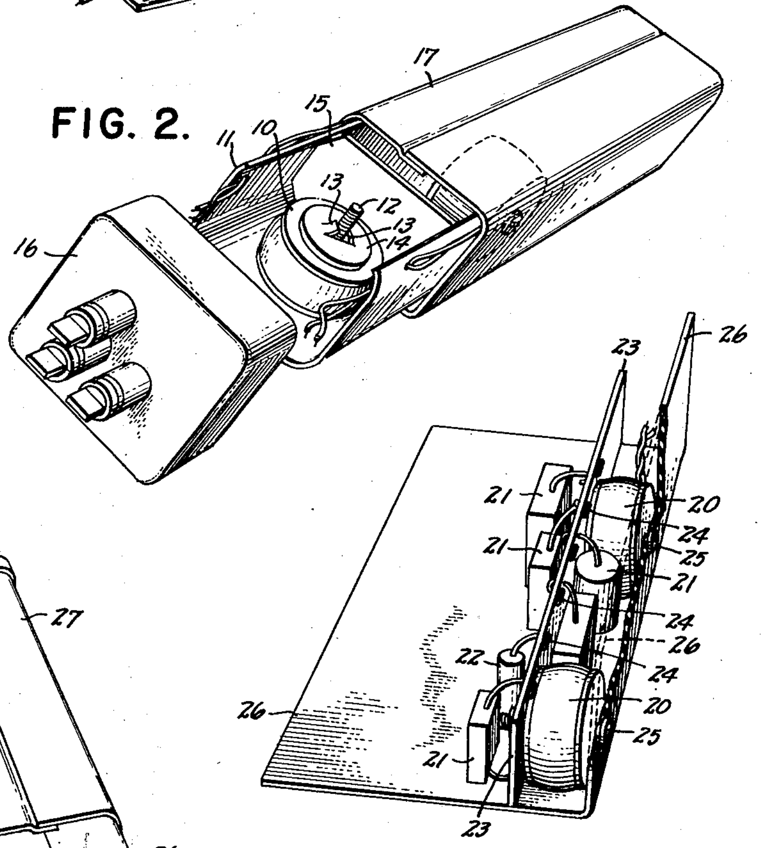
Fig. 2 is a perspective view of the assembly of Fig. 1 after the sheet is wrapped around the components and the assembly partially inserted in its container.
Fig. 3 is a perspective view of an open flexible insulating sheet showing a modified form of assembly.

The first embodiment of this invention, illustrated by Figs. 1 and 2 comprises a plurality of components 10, which by way of example, are induction components such as transformers or coils. The components 10 are mounted on an insulating sheet 11, which is preferably a resilient sheet of cardboard, by means of speed bolt assemblies, or any of the other well known mounting means. The speed bolts 12 are directed from the bottom of the insulating sheet and mesh with the flanges 13 which are cut in the nut 14 positioned on the components 10. A U-shaped shield 15 is positioned between the insulating sheet 11 and the inductive component 10 and is held rigidly in place by the speed bolt which holds the component in place. The speed bolt 12 makes direct contact with the shield 15 thereby forming an electrical connection between the two elements. The components 10 are placed so that upon folding the insulating sheet into the form of a U, the shielded component will be positioned on the side of the U and the adjacent components will be positioned on the base of the U; therefore the flux of each alternate component will be cutting the flux of the other component at right angles, and the shield 15 is in position to electrostatically shield each of the components from the adjacent components.

According to one aspect of the invention, a sequence of assembly which is followed is to mount the components on the insulating sheet, connect the leads from the components to a terminal lid 16, wrap the insulating sheet in the form of a U around the components and insert the wrapped components in a metallic container 17; the external dimensions of the U being slightly smaller than the internal dimensions of the container. Thus when the sheet is released in the container, the sheet, by virtue of its flexibility and size, fits tightly against the sides of the container; therefore the sheet is firmly held in place without the aid of additional fastening members. After the sheet and components have been fully inserted in the container the terminal lid 16 may be fastened to the container by solder, wax, etc.

The shield 15 is electrically connected to the container 17 by means of the head of the speed bolt protruding on the opposite side of the insulating sheet 11 and making sliding contact with the inside wall of the container 17.

Figure 4:
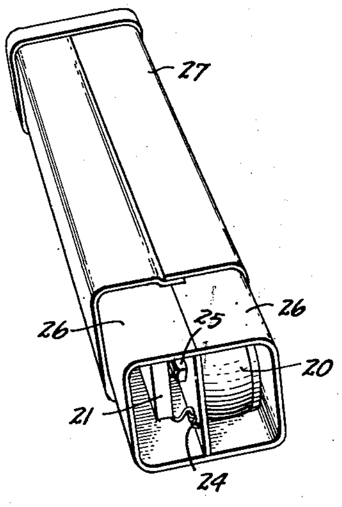
Fig. 4 is a perspective view of the assembly of Fig. 3 after the sheet is wrapped around the components and the assembly partially inserted in its container.

The second embodiment of this invention, illustrated by Figs. 3 and 4 includes a filter assembly having, for example, a plurality of inductive components 20, capacitive components 21, and resistance components 22. The leads from the capacitors and resistors are connected to either side of a first insulating sheet 23, by means of conductor terminals 24. The inductive elements 20 are fastened by bolt and nut, arrangements 25, between the first insulating sheet 23 and a second insulating sheet 26. The first insulating sheet 23 serves as a vertical insulating partition between the components and as a mounting board for the components mounted thereon; the second insulating sheet 26 is completely wrapped around the components and thus inserted in the metallic container 27. The leads from the various components are connected to the appropriate terminals on a terminal lid (not shown) either before or after the second insulating sheet is wrapped around the components. As in the first embodiment, when the second sheet is released it fits tightly against the inside of the container and is thereby firmly held in place. The terminal lid may be fastened to the container 27 in the manner described with respect to the first embodiment.

While I have described above the principles of my invention in connection with specific apparatus, it is to be clearly understood that this description is made only by way of example and not as a limitation to the scope of my invention.

What is claimed is:

An output transformer assembly comprising a plurality of inductive components having leads, a metal container enclosing said components, an insulating sheet formed in the shape of a U, the sides of the sheet fitting tightly against the inside of said container, means mounting each alternate component on a side of said U and each other component on the bottom of said U so that the flux lines of each alternate component will cut at right angles the flux lines of its adjacent component, an electrostatic shield connected to each alternate component, a terminal lid on said container, and means connecting said leads to the terminal lid.

References Cited in the file of this patent

UNITED STATES PATENTS

| Number | Name | Date |
|---|---|---|
| Re. 23,203 | Posen | Mar. 7, 1950 |
| 1,935,354 | Dressel | Nov. 14, 1933 |
| 2,076,771 | Eastman | Apr. 13, 1937 |
| 2,375,211 | Brennan | May 8, 1945 |
| 2,439,408 | Mitchell | Apr. 13, 1948 |
| 2,647,224 | Bruck | July 28, 1953 |

FOREIGN PATENTS

| Number | Country | Date |
|---|---|---|
| 635,947 | Great Britain | Apr. 19, 1950 |